March 7, 1939.　　　F. K. KILIAN　　　2,149,349
RUBBER TIRED ROLLER
Filed March 17, 1937
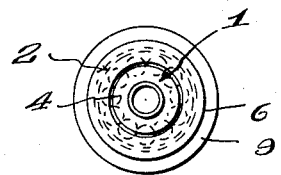
Fig-1-
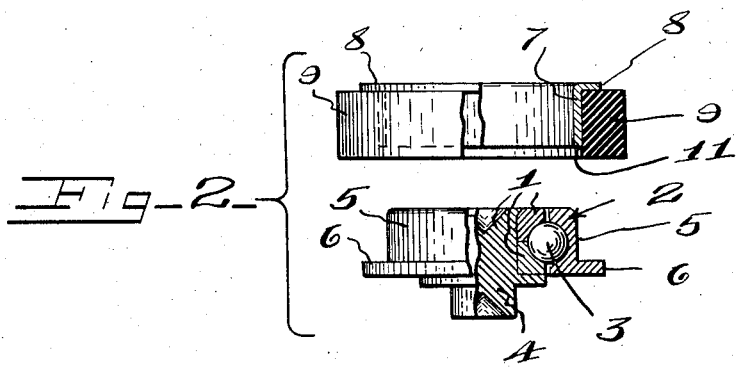
Fig-2-
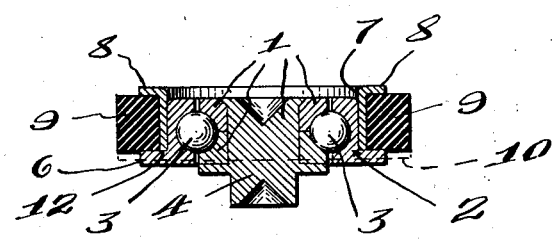
Fig-3-
INVENTOR.
Frederick K. Kilian
BY Bedell & Thompson
ATTORNEYS.

Patented Mar. 7, 1939

2,149,349

UNITED STATES PATENT OFFICE 2,149,349

RUBBER TIRED ROLLER

Frederick K. Kilian, Syracuse, N. Y., assignor to Kilian Manufacturing Corporation, Syracuse, N. Y., a corporation of New York Application March 17, 1937, Serial No. 131,432

1 Claim. (Cl. 308—6)

This invention relates to rollers, particularly small rollers or wheels, such as are used in cabinets and the like, to render the drawers, etc. easily operable, and has for its object a particularly simple, efficient, economical and durable tire and tire assembly, particularly for this type of small rollers.

More specifically, it has for its object a roller or small wheel of this type, wherein a tire of compressible material, as rubber, is held by a press-on ring or rim on the roller or the body thereof and compressed into a thickness less than its normal thickness, whereby it is solidly secured to the roller and held from distortion or flattening out of circular form.

The invention consists in the novel features and in the combinations and constructions hereinafter set forth and claimed.

In describing this invention, reference is had to the accompanying drawing in which like characters designate corresponding parts in all the views.

Figure 1 is an elevation of a roller embodying this invention.

Figure 2 is an expanded view, partly in section, of parts of the roller, the parts being shown on an enlarged scale.

Figure 3 is an enlarged transverse sectional view of the parts of the roller and the tire rim and tire thereon in assembled position.

This invention comprises, generally, a roller including a body element having a peripheral surface, usually a substantially cylindrical peripheral surface with an annular flange projecting from said surface and a press-on tire rim having a tire of compressible material, as rubber, seated thereon, the rim having a flange opposed to the flange of the body element and serving to press the tire into a thickness slightly less than the normal thickness of the tire, in order to solidly or rigidly secure the tire to the roller or the body element thereof and hold it permanently in circular form without distortion that might otherwise develop during the use of the roller in cabinets or other situations in which it is used.

The roller here shown is of the anti-friction type and includes inner and outer elements 1, 2 having a raceway between them for receiving anti-friction members, as balls 3. The inner element also includes a central member 4 on which sections of the inner raceway are mounted. This central member 4 is shown as provided with a stem but may be of any other construction suitable for mounting the roller.

The outer body element 2 is formed with a peripheral bearing face 5, which is substantially cylindrical, and with an annular flange 6 at one side of the surface 5 or at one end of the roller.

7 designates a press-on ring or tire rim which is substantially cylindrical in form and provided with an annular flange 8 opposed to the flange 6. 9 is a tire of compressible material, as rubber, seated on the ring 7 against the flange 8 and normally fitting the ring. The tire is preferably rectangular in form in cross section and when the ring 7 is pressed on the peripheral surface 5 of the outer body element 2, is compressed into a slightly less thickness than its normal thickness. The normal thickness before compression is indicated by the broken line 10 (Figure 3) and also in Figure 2 by the distance between the lower edge 11 of the ring 7 and one side of the tire, bearing in mind that Figures 2 and 3 are enlarged views and that the relative amount of compression is seen by a comparison between Figures 1 and 2. Preferably, the press-on rim is of such a width that the edge thereof, which is the lower edge in Figures 2 and 3, abuts against the base of the flange 6, as at 12 (Figure 3), when the parts are assembled.

By this roller construction, the roller, particularly small rollers, can be provided with a long-lived tire which does not work lopsided or out of round and which always rolls easily and without noise.

What I claim is:—

A roller comprising a body element including a central member, inner and outer raceways with antifriction members between them, the inner raceway being mounted on the central member and the outer raceway having a cylindrical peripheral surface and an annular circumferential flange at one edge of said surface, a press-on ring snugly fitting the periphery of the outer raceway and having an annular peripheral flange opposed to the former flange, and a tire on the rim compressed between said flanges.

FREDERICK K. KILIAN.